Sept. 30, 1930.  O. LEE  1,776,792
WRENCH
Filed Feb. 18, 1929
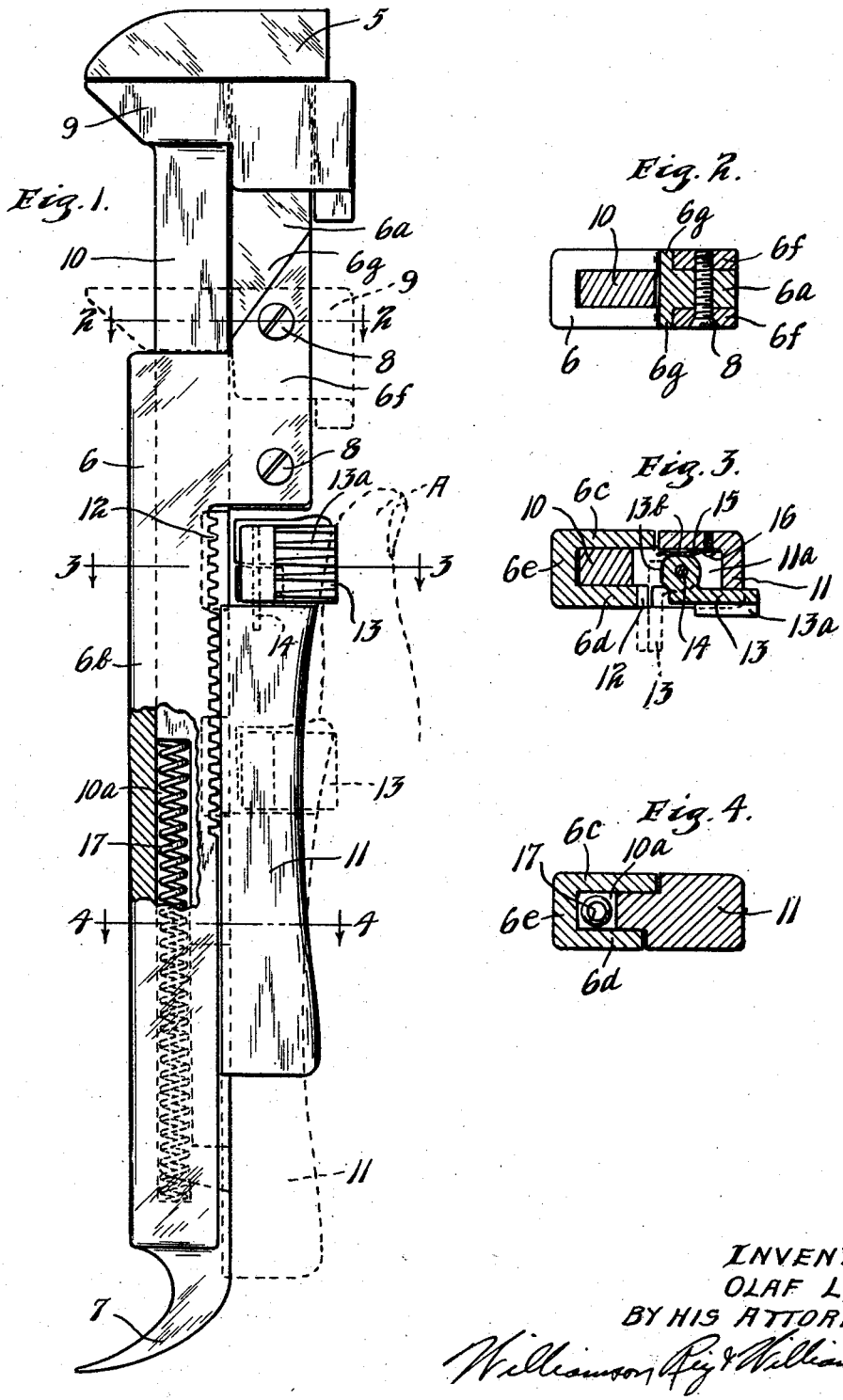
INVENTOR.
OLAF LEE.
BY HIS ATTORNEYS.

Patented Sept. 30, 1930

1,776,792

UNITED STATES PATENT OFFICE

OLAF LEE, OF MINNEAPOLIS, MINNESOTA

WRENCH

Application filed February 18, 1929. Serial No. 340,720.

It is the object of this invention to provide a novel and improved wrench of the monkey wrench type, which the user can readily hold and adjust to fit nuts, bolts, etc. of various sizes by use of merely one hand.

To this end, the invention consists in the novel parts and novel combinations of parts hereinafter defined in the claim and described in the following specification, made in connection with the accompanying drawings wherein like reference characters refer to the same or similar parts throughout the various views and in which:

Fig. 1 is a view in side elevation of the wrench illustrating the movable parts in one position in full lines and in another position in dotted lines;

Fig. 2 is a section taken on the line 2—2 of Fig. 1, as indicated by the arrows;

Fig. 3 is a section taken on the line 3—3 of Fig. 1, as indicated by the arrows; and Fig. 4 is a section taken on the line 4—4 of Fig. 1, as indicated by the arrows.

Referring to the drawings, the wrench includes an upper fixed jaw 5 having a shank or handle 6 made in two sections $6^a$ and $6^b$ for convenience in assemblage. The section $6^b$, hereinafter called the handle section of the shank, from its function, is of substantially U-shape in cross section and includes the sides $6^c$ and $6^d$ and the edge $6^e$. At its lower end, the handle section $6^b$ has a curved point 7 formed thereon, closing the lower end of the channel formed by the section $6^b$ and providing a convenient point for the pulling of cotter pins, staples, etc. At the upper end of the handle portion $6^b$, the sides $6^c$ and $6^d$ project rearwardly a considerable distance farther than the remainder of the sides $6^c$ and $6^d$ to form portions $6^f$ between the lower end of the upper shank section $6^a$ is adapted to be received. The portions $6^f$ terminate in a diagonal line and the shank portion $6^a$ is reduced in width adjacent its lower end to form diagonal shoulders $6^g$ which abut the diagonal portions of the upper ends of the portions $6^f$. Countersunk machine screws 8 are used for connecting the portions $6^f$ to the reduced portions of the upper part $6^a$ of the shank. The upper section $6^a$ of the shank is connected to the rear bottom portion of the jaw 5 and the jaw 5 forms shoulders with the shank portion $6^a$. A lower movable jaw 9 is provided having a rectangular opening therethrough, through which the shank section $6^a$ projects whereby the movable jaw 9 can be slid upwardly or downwardly freely on the shank section $6^a$. The movable jaw 9 has a shank 10 of bar shape secured to the forward bottom side thereof and the shank 10 fits within the channel formed by the handle section $6^b$ of shank 6 below the portions $6^f$. A handle member 11 is secured to or formed integral with the shank 10 and this handle member is of the same width as the handle section $6^b$ and has forward shoulders which ride against the rear edges of the two sides $6^c$ and $6^d$. The rear edge of the handle member 11 is curved to conveniently fit the palm of the hand of the user. Rack teeth 12 are formed on the rear edge of the side $6^d$ of shank 6 below the portion $6^f$ and these teeth project downwardly for a distance corresponding to the length of movement of the movable jaw 9 relative to the fixed jaw 5. A notch $11^a$ is cut in the handle member 11 adjacent, but not at the upper end thereof, and a dog 13 is mounted on a longitudinal pivot 14 mounted in the handle member 11 and running across the notch $11^a$. The dog 13 is essentially in the shape of a right angular lever, the swinging end of which carries a number of V-shaped teeth $13^a$ of greater width at their rear ends, as shown in full lines, Fig. 1 than at their forward ends. The dog 13 has two flat surfaces $13^b$ at its inner two sides and a flat bar spring 15 secured as by a small screw 16 to the handle member 11 at the bottom of the notch $11^a$, is adapted to bear against either one or the other of the two flat surfaces $13^b$ to hold the dog 13 in either the retracted position shown in full lines Fig. 3, or in the engaging position shown in dotted lines Fig. 3. It will be seen that when the dog 13 is pressed forwardly as by the thumb of the operator, from the retracted position, Fig. 3, to the engaging position shown in dotted lines Fig. 3 the teeth $13^a$ will be carried into engagement with the rack teeth 12 on the handle section $6^b$ of the shank 6 and as these teeth 13ª at their forward or first engaging ends are of considerably narrower width than at their rear ends the teeth will find their way into proper engagement with the teeth 12. The shank 10 is cut away at its lower forward side at 10ª to form with the two sides 6ᶜ and 6ᵈ a socket for the upper end of a light coiled pressure spring 17. The lower end of the spring 17 fits within a small socket formed in the pointed member 7 at the lower end of the shank handle 6ᵇ. The spring 17 will accordingly normally act to move the shank 10 upwardly in the channel formed in the handle shank 6ᵇ to slide the movable jaw 9 into engagement with the fixed jaw 5.

In use, the wrench will be grasped with one hand of the operator, the thumb A of the operator taking the position illustrated in dotted lines Fig. 1 and the fingers and palm of the operator grasping the handle shank 6ᵇ and the handle member 11. When it becomes desirable to adjust the wrench to a nut of a certain size the thumb will be moved downwardly relatively to the fingers until the movable jaw 9 is properly spaced relative to the fixed jaw 5 to receive the nut. This movement will be against the tension of the spring 17. The dog 13 may then be easily thrown into engaging position so that the teeth 13ª engage certain of the rack teeth 12, whereupon the wrench is in proper position to receive the nut. As the nut is being turned, the thumb A of the operator may hold the dog in the engaging position, although if desired the spring 15 may be made heavy enough to hold the dog in engagement with the rack teeth 12 so that the thumb need not be applied continuously to the dog.

If the movable jaw 9 be spaced from the fixed jaw 5 a greater distance than the nut to which the wrench is to be fitted, and the nut be pressed between the movable jaw and the fixed jaw 5, the spacing of the two jaws 9 and 5 relatively to each other can be properly gauged by merely releasing the handle member 11 whereupon the spring 17 will act to force the shank 10 and the movable jaw 9 carried thereby toward the fixed jaw 5 until the nut is closely held by the two jaws 5 and 9. The dog 13 can then be thrown into engagement with the rack teeth 12, whereupon the wrench applied to the nut will be ready for use.

It will, of course, be understood that various changes may be made in the form, details, arrangement and proportions of the parts without departing from the scope of the present invention.

What is claimed is:

A wrench comprising a fixed jaw, a shank secured to said fixed jaw and having a hollow and open sided offset portion thereon, a movable jaw mounted on said shank for sliding movement thereon, a shank secured to said movable jaw and extending through said shank of the fixed jaw and fitting within the hollowed offset portion thereof for sliding movement therein, a handle portion secured to the shank of said movable jaw and mounted for sliding movement along the open side of said offset portion, rack teeth cut on the edge of the open side of said offset portion adjacent said handle member and a dog pivoted to said handle member and adapted to be thrown into engagement with said teeth to hold said movable jaw in a desired spaced relation from said fixed jaw.

In testimony whereof I affix my signature.

OLAF LEE.